W. N. ALLAN.
VEHICLE WHEEL.
APPLICATION FILED FEB. 21, 1920. RENEWED JAN. 31, 1921.
1,389,472.
Patented Aug. 30, 1921.
2 SHEETS—SHEET 1.
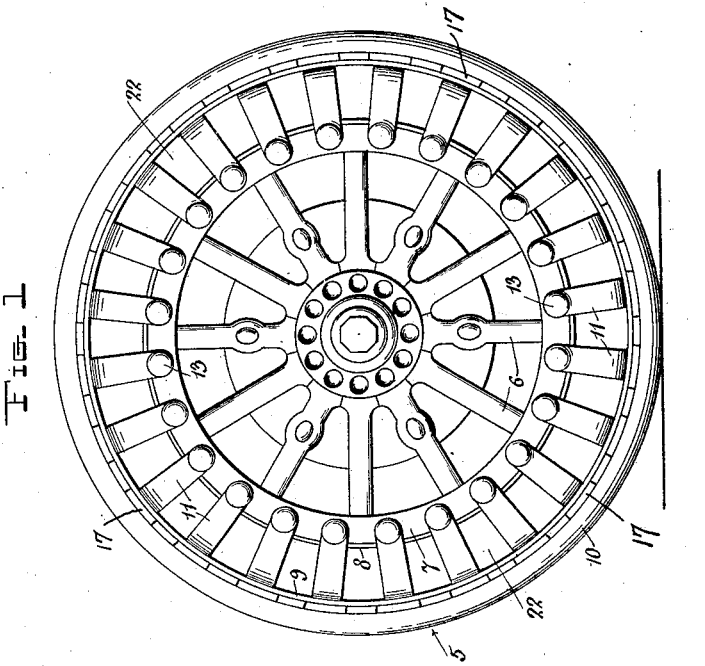
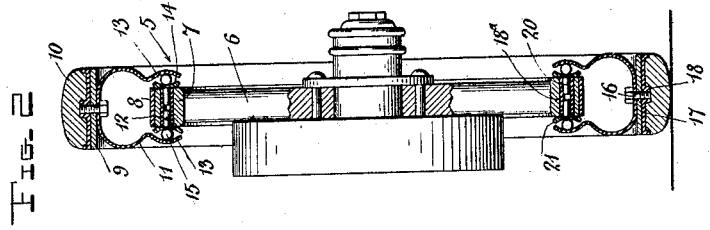
WITNESSES:
INVENTOR
William N. Allan,
BY
ATTORNEY W. N. ALLAN.
VEHICLE WHEEL.
APPLICATION FILED FEB. 21, 1920. RENEWED JAN. 31, 1921.
1,389,472.
Patented Aug. 30, 1921.
2 SHEETS—SHEET 2.
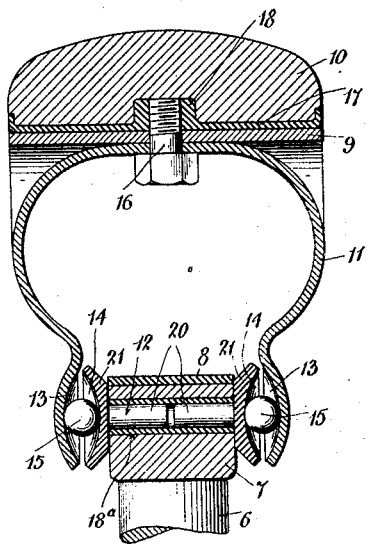
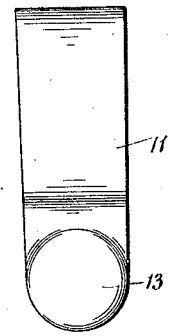
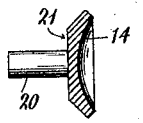
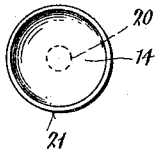
WITNESSES:
INVENTOR
William N. Allan,
BY
ATTORNEY

UNITED STATES PATENT OFFICE.

WILLIAM N. ALLAN, OF SAN ANTONIO, TEXAS.

VEHICLE-WHEEL.

1,389,472.  Specification of Letters Patent.  Patented Aug. 30, 1921.

Application filed February 21, 1920, Serial No. 360,425. Renewed January 31, 1921. Serial No. 441,455.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The present improved tire is of the spring cushion type wherein a plurality of spring units and rigid devices are interposed between the wheel felly and tread and, respectively, connected to the tread and felly. The spring unit extremities overlap the extremities of the rigid devices and the sets of overlapping extremities are formed with sockets having anti-frictional devices interposed between and engaging the same, and whereby the extremities of the spring units and of the rigid devices may have relative longitudinal sliding or shifting movement to compensate for pressure stresses to which a tire is subjected during its service. The present improved tire organization is very similar to that embodied in my copending applications, Serial Numbers 360,423 and 360,424, filed February 21, 1920, but differs essentially from these copending tire structures in that a spring unit and a rigid device coöperates in each group, and the spring unit is of heavier construction to adapt the tire for work wherein the weight stress of the vehicle load is materially greater than on an ordinary automobile wheel or tire.

The present invention consists in the preferred construction and arrangement of the several parts, which will be more fully hereinafter described and claimed.

In the drawings:

Figure 1 is a side elevation of a wheel embodying the improved tire.

Fig. 2 is a transverse vertical section through the vertical center of the wheel and tire.

Fig. 3 is an enlarged transverse vertical section through the improved tire and felly.

Fig. 4 is a side elevation of one of the spring units.

Figs. 5 and 6 are detailed views, respectively, in section and front elevation of a part of one of the rigid devices or units.

The numeral 5 designates a wheel of any suitable construction having spokes 6 and a felly 7, which may be of any desired form, but is shown as having an outer band 8 surrounding and secured to the same. The construction of the wheel and its component felly, however, is not essential and may be varied indefinitely. The tire embodying the present improved features comprises as its main elements an outer spring band 9, a solid elastic tread 10, groups of spring units 11 and rigid devices or units 12, each spring unit 11 and rigid device or unit 12 having their extremities overlapped and formed with circular spherical sockets 13 and 14. The opposed overlapping sockets 13 and 14 of the spring and rigid units have anti-frictional devices or balls 15 interposed therebetween and engaging the reversely arranged concave faces of the sockets. Each spring unit 11 is comparatively thicker or heavier than the spring units disclosed in the structures of my copending applications hereinbefore specified, and said unit 11 is secured by a suitable fastening 16 extending through the central portion thereof to the spring band 9 and the tread organization 10, the latter having transversely extending tread holding plates 17 with central screw-threaded sockets 18 to receive the several fastenings or bolts 16, as clearly shown in Fig. 3. The rigid devices or units 12 are held in the felly 7, the latter being transversely bored at regular intervals to form a plurality of openings 18ª therearound in which metal bushings or wear sleeves 18ᵇ are inserted, and in these wear sleeves cylindrical stems or shanks 20 are inserted from opposite ends of each opening, the shanks having outer heads 21 abutting against the opposite sides of the felly and in which the sockets 14 are formed. The stems 20 and heads 21 are combined in the rigid device or unit, and will be formed of suitable metal having a degree of hardness sufficient to resist wear. If found necessary, anyone of the combined shanks 20 and heads 21 may be removed from the felly and another similar device substituted therefor.

The spring units 11 and the rigid units 12 will be disposed around the wheel felly in regular relation and separated by uniform spaces 22, thereby forming a tire of open structure which will permit free ventilation thereof and also generally lighten the weight of the same without in the least detracting from the requisite strength and durability of a tire of this class. The spring units 11, as hereinbefore described, are heavier than the spring units disclosed in my copending applications to permit the tire to be used for heavier work and also to maintain the sockets in the extremities of the unit 11 in overlapping connected association with the sockets 14 of the rigid device or unit. The operation of the present improved tire is very similar to the operations of the tire of my copending applications, and when the tire is subjected to compression stress at any point the adjacent spring units respond thereto and the extremities thereof ride or slide over the extremities of the rigid devices or units, the extremities of the spring units expanding, but are continually maintained in operative or connected association with the sockets 14 by the interposed balls 15, in view of the fact that the latter are free to move or ride in the sockets and travel toward the converged peripheries of the opposing pairs of sockets, and hence the sockets of the spring units and of the rigid devices or units will be maintained in operative relation without the liability of accidental separation or disorganization. As in my copending structures, the spring band 9 materially augments the resiliency of the tire, and assists in the restoration of the parts or the tire to normal condition after it has been relieved of compression stress or strain. It will also be understood that the general proportions and dimensions of the several parts of the improved tire may be modified at will. In assembling the parts of the tire the extremities or the sockets 13 of the spring unit are sprung over the sockets 14 of the rigid device or units, and released when the antifrictional device or balls have been inserted between the pairs of sockets; and conversely a disjointure of the spring and rigid units may be affected by forcing the sockets 13 or the extremities of the spring units outwardly to release the balls 15, when the tire, as a whole, may be readily removed. Moreover, anyone of the spring units 11 may be removed and a similar device substituted therefor without dismantling or disorganizing the entire wheel or tire structure.

What is claimed as new is:

1. A tire comprising a spring unit, a rigid unit, the spring unit and rigid unit having overlapping extremities provided with sockets, the sockets of the spring unit being directly formed as integral parts of the extremities thereof and located outside of the sockets of the rigid unit, and antifrictional devices interposed and freely movable between and engaging the said sockets and holding the latter in reciprocating spaced relation, the sockets of the spring unit being clear of any part of the rigid unit for unrestricted movement.

2. A tire comprising a spring unit and a rigid unit, the two units having overlapping ends held in association for relative reciprocating movement, the ends of the spring unit being located outside of the ends of the rigid unit and clear of all parts of the latter for unrestricted movement.

3. A tire comprising a spring unit with sockets integrally formed with the extremities thereof and opening inwardly, a rigid unit consisting of oppositely disposed devices having outer terminal sockets, the sockets of the spring unit extending over the outer portions of the sockets of the rigid unit, and antifrictional devices interposed between and engaging the sockets of the spring and rigid units.

4. The combination of a felly having transversely extending openings therethrough, a spring band extending around the felly and spaced therefrom, rigid units comprising stems removably inserted in reverse positions in the openings of the felly and having outer terminal sockets, spring units connected to the said band and having sockets at the free extremities overlapping the terminal sockets of the rigid units, and anti-frictional devices interposed between and engaging the sockets of the spring and rigid units and holding the same in relative reciprocating association.

In testimony whereof I have hereunto set my hand.

WILLIAM N. ALLAN.